June 12, 1951 W. E. RANEY 2,556,484
CABLE PULLER
Filed Dec. 9, 1948 2 Sheets-Sheet 2

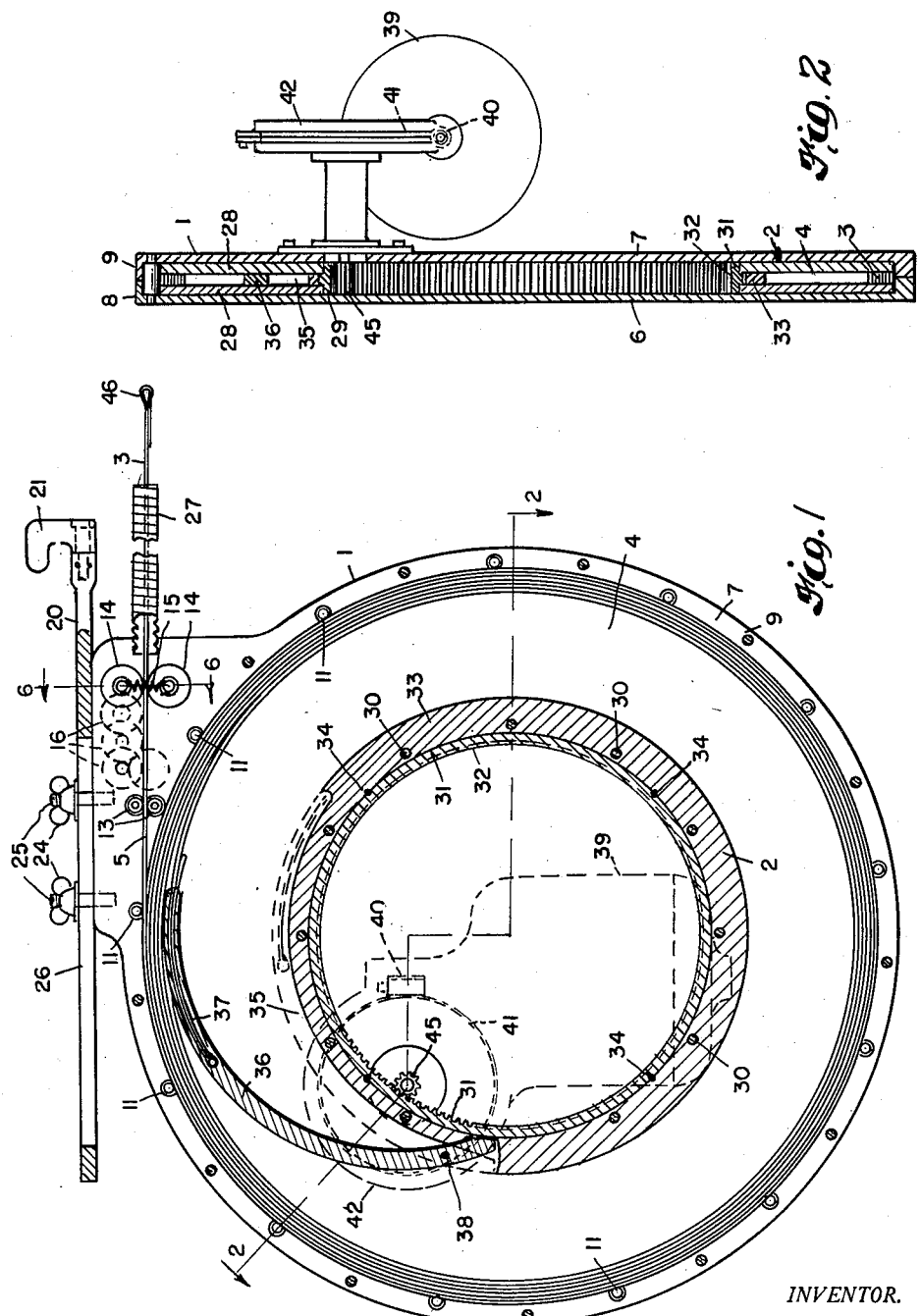

INVENTOR.
WILLIAM E. RANEY
BY
Oberlin & Limbach
ATTORNEYS.

Patented June 12, 1951

2,556,484

UNITED STATES PATENT OFFICE 2,556,484

CABLE PULLER

William E. Raney, Lakewood, Ohio, assignor of one-half to The C. M. Penney Co., Cleveland, Ohio, a corporation of Ohio Application December 9, 1948, Serial No. 64,409

8 Claims. (Cl. 175—376)

The present invention while relating generally as indicated to a cable puller having particular utility in drawing cables and conductor wires through conduits is more especially concerned with a unique and simplified form of such device whereby a fish-wire or snake may be payed out from a supply reel through conduits under varying conditions of resistance without inducing buckling or other undesirable distortion thereof.

Hitherto various apparatuses have been devised for feeding fish-wire into a conduit and drawing the fish-wire out of the conduit to thus draw a cable or conductor wire attached thereto into said conduit. However, such prior apparatuses are open to the objection that they are unnecessarily bulky and complex either because the fish-wire is wound in a spiral groove formed in the reel thereof or because both the fish-wire and a driving wire are wound on one reel, in which case a second reel must be provided for rewinding the driving wire from said first reel to thereby pay out the fish-wire or because of elaborate driving means frictionally engaged with a length of the fish-wire drawn from the coil thereof.

In the first two of such prior illustrative examples the diameter of the reel and thus of the case therearound is considerably greater than would otherwise be necessary if only the fish-wire were spirally coiled on the reel with adjacent convolutions in contact and in the third example, the driving means disposed to one side of and radially beyond the diameter of the reel adds considerably to the bulk of the apparatus and furthermore the resistance to free rotation of the reel which must be imposed to preclude over-running entails expenditure of extra effort in paying out the fish-wire.

Accordingly, it is one principal object of this invention to provide a cable pulling apparatus in which a closely coiled fish-wire is fed or payed out from the reel case by a driving force applied through the inner end of the fish-wire whereby the core thereof is progressively expanded with the outer convolution constantly engaging a confining wall in the case and thus supported against buckling.

Another object is to provide a cable puller in which the aforesaid confining wall is provided with anti-friction means to reduce the driving force to a minimum so as to be essentially the same as the resistance encountered by the fish-wire during its passage through a conduit.

Another object is to provide a cable puller in which the anti-friction means in the confining wall encircling the reel also provides a bearing for freely rotatably supporting the reel within the case.

Another object is to provide a cable puller employing a reversible power means for driving the reel in opposite directions.

Another object is to provide a novel form of force transmitting member between the hub of the reel and the inner end of the fish-wire which moves radially outward and applies radial outward and tangential force components on the inner end of the fish-wire to thus expand the core of the fish-wire coil and maintain the outer convolution against the confining wall of the case with all of the intermediate convolutions against one another whereby to provide a solid coil at all times.

Another object is to provide an adjustable hooked support member on the reel case by which the apparatus may be hung close to the outlet box as when feeding or driving ahead the fish-wire and moved away from the outlet box as when rewinding the fish-wire, in which latter case a desired extra length of cable or conductor wire will be drawn into the box for splicing and connection purposes.

Another object is to provide a cable puller having a counter thereon which reads directly the payed-out length of the fish-wire without requiring marking of the wire and further enables stopping of the drawing in of the fish-wire at predetermined intervals for removal or addition of conductor wires on the outer end thereof.

Another object is to provide a cable puller of a compact and portable nature and of a most simple, efficiently operating construction.

Other objects and advantages will become apparent as the following description proceeds.

To the accomplishment of the foregoing and related ends, said invention, then, comprises the features hereinafter fully described and particularly pointed out in the claims, the following description and the annexed drawing setting forth in detail one illustrative embodiment of the invention, this being indicative, however, of but one of the various ways in which the principle of the invention may be employed.

In said annexed drawing:

Fig. 1 is a cross-section view taken along a plane perpendicular to the central axis of the reel and case therefor;

Fig. 2 is a cross-section view taken substantially along the plane indicated by the line 2—2, Fig. 1;

Fig. 3 is a cross-section view similar to Fig. 2 except taken along a different plane and on an enlarged scale to more clearly illustrate the detail construction;

Figure 3:
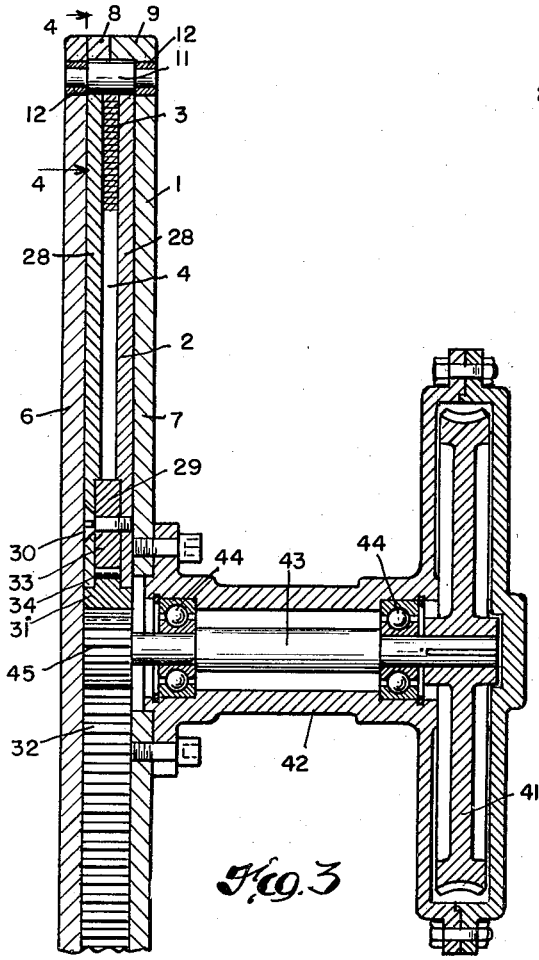
Figure 7:
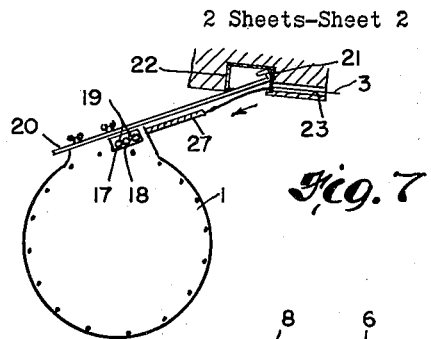
Figure 4:
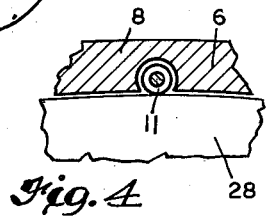
Figure 6:
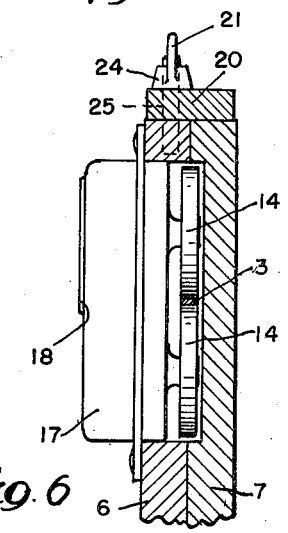
Figure 5:
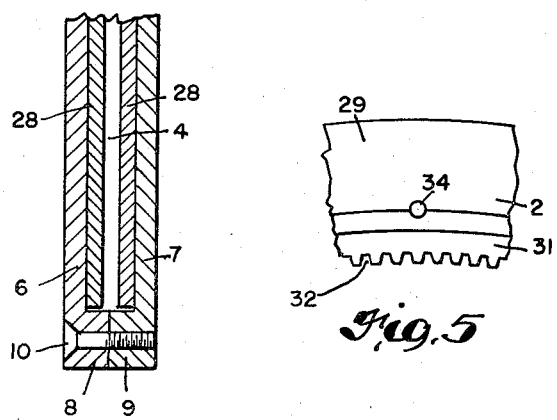
Figure 8:
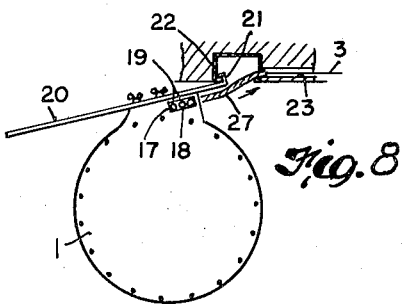

Fig. 4 is a cross-section view taken substantially along the plane indicated by the line 4—4, Fig. 3;

Fig. 5 is a fragmentary elevation view of the reel for the fish-wire;

Fig. 6 is a cross-section view taken substantially along the plane indicated by the line 6—6, Fig. 1, on an enlarged scale illustrating a measuring device provided with dials for indicating the length of fish-wire payed out from the reel; and Figs. 7 and 8 are elevation views respectively illustrating the positions of the apparatus relative to a conventional conduit box and conduit connected to said box when pulling the fish-wire or tape in a direction away from said box and conduit and when pushing the fish-wire into said conduit.

In the embodiment of the invention herein illustrated, there is provided a case 1 rotatably supported on a reel 2 which carries a spirally coiled fish-wire 3, said case being formed with a cylindrical chamber 4 for said reel and fish-wire and with a tangentially disposed passage 5 through which the wire 3 passes in opposite directions when payed out and rewound onto said reel. Said case may comprise juxtaposed plate-like parts 6 and 7 formed with abutting marginal rims 8 and 9 and held together as by a series of circularly arranged screws 10 or other desired fastening means. Said case parts define between them the aforesaid cylindrical chamber 4 and the tangentially disposed passage 5.

Around the cylindrical wall of such chamber 4 are a plurality of uniformly spaced cylindrical rollers 11 having their axes parallel to the axis of the chamber and having their ends rotatable in bushings 12 fitted in the respective case parts 6 and 7 and their intermediate portions exposed and extending a slight distance into such chamber whereby to constitute an anti-friction means or bearing for the coil of fish-wire 3 and for the reel 2, as will hereinafter appear.

Adjacent the inner end of passage 5 is a pair of freely rotatable cylindrical guide rollers 13 similar to the aforesaid rollers 11 adapted to engage the opposite sides of the fish-wire and thus guide the wire through the passage with minimum friction.

Also in passage 5 is a pair of measuring rolls 14 yieldably drawn together as by spring 15 into frictional engagement with opposite sides of the fish-wire 3 and thereby caused to be rotated in response to movement of the wire therebetween, said rolls 14 driving a gear train 16 of which a series of gears have indicating dials 19 thereon contained within a housing 17 and visible through a transparent window 18. Said dials 19 are preferably arranged so as to be readable in a manner generally similar to the dials of conventional gas and electric meters whereby the reading of successive dials will indicate the number of feet of fish-wire 3 which has been payed out. As apparent, said measuring or counting device also operates in reverse whereby to read zero when all of the fish-wire has been rewound onto reel 2 and is of a form as indicated so as not to require marking of the wire.

Mounted on case 1 is an elongated support member 20 which is longitudinally adjustable along a path generally parallel to passage 5 and which is provided with a swiveled hook 21 at its outer end for suspending the case as from an outlet box 22 (see Fig. 8) when feeding the fish-wire 3 into the conduit 23 leading into said box and for abutting said box (see Fig. 7) when rewinding the fish-wire and drawing the cable or conductor wires connected thereto into said conduit. Such longitudinal adjustment of the support member 20 is effected by loosening the wing nuts 24 which are threaded onto the studs 25 anchored in case 1 and extending through a longitudinally extending slot 26 formed in said support member.

Connected to case 1 at the outer end of passage 5 is a flexible conduit 27 which constitutes a flexible extension of such passage adapted to be inserted into a conduit into which the fish-wire 3 is to be fed. When feeding fish-wire into a conduit, said support member 20 is preferably adjusted relative to case 1 so that the flexible conduit 27 will reach into the conduit, and when rewinding the fish-wire 3 to pull a cable or conductor wires into the conduit, said support member is adjusted to position case 1 further away from the conduit box or from the conduit whereby an extra length of cable or conductor wires will be drawn into the conduit box for splicing or connection purposes.

As previously indicated, the fish-wire 3 is spirally coiled on reel 2, said reel comprising, as for example, circular side flanges 28 of diameter such that the rollers 11 provide an anti-friction bearing for said reel and a central hub 29 around which the fish-wire 3 is wound. In the illustrated embodiment of the invention, said flanges 28 are disposed on opposite sides of said hub 29 so as to be axially spaced apart a distance substantially corresponding with the width of the fish-wire 3, said flanges being mounted on said hub by rivets, welding or other means such as the screws 30 illustrated. Said hub 29 comprises a ring gear 31 formed with internal teeth 32 optionally formed of one piece or of two pieces 31 and 33, as shown, with dowel pins or keys 34 non-rotatably connecting together said pieces 31 and 33. It is further contemplated to form said reel from flanges and a hub each having the same inside diameter and forming the gear teeth therein while in assembled relation. In some instances it has been found feasible to omit the flanges 28, in which event the opposite parallel walls of the cylindrical chamber 4 will be spaced apart a distance corresponding with the width of the fish-wire 3.

Said hub 29 is provided with a circumferentially extending recess 35 in which a curved driving member or arm 36 is fitted, the curvature of the outer face of said member 36 conforming with the contour of the hub whereby to form a substantially continuous cylindrical surface for the inner convolution of the fish-wire 3. The inner end of the fish-wire 3 is formed with a loop or eye 37, as shown, with such eye and doubled-back portion of the wire adjacent such eye fitting into a correspondingly shaped curved slot in one end of said driving member 36.

The other end of said driving member 36 is pivotally connected to said hub 29 on a pivot 38 having its axis parallel to the hub axis so that the free end of said driving member which is connected to the inner end of the fish-wire is capable of moving radially into and out of the recess 35. Said driving member 36 is of a length considerably greater than the radial width from said hub to the cylindrical confining wall of chamber 4 so that the maximum driving angle between a line from pivot 38 to the free end of said driving member and a line tangent to a circle co-axial with the hub axis and passing through pivot 38 is insufficient to buckle or distort the fish-wire. Herein such maximum driving angle is on the order of 25° when all of the wire has been payed out. It is further to be noted that when all of the wire 3 has been payed out the end of the driving member will be disposed adjacent the guide rollers 13 and within the passage 5 to thereby preclude further clockwise rotation of the reel 2 and resulting severe bending or breaking of the wire 3. As best shown in Fig. 1 the entrance to the passage 5 forms a recess extending radially beyond the coil confining wall of the case 1, the end of the arm 36 being adapted to swing radially outward into such recess upon paying out of all of the fish-wire whereby to positively arrest continued rotation of the reel 2.

Rotation of said reel 2 in opposite directions is effected by a reversible electric motor 39 carried by case part 7 and provided with a worm 40 on its drive-shaft engaged with a worm wheel 41, said worm wheel being contained in a housing 42 bolted to case part 7 and keyed to a shaft 43 rotatably supported in said housing by the axially space bearings 44. Said shaft 43 extends into case 1 and has a pinion gear 45 thereon in mesh with the ring gear 31.

With the foregoing detailed description of one form of the present invention in mind, it is apparent that with a full coil of fish-wire 3 wound onto reel 2 having its inner convolution around said hub 29 and its outer convolution substantially in contact with the rollers 11 around the cylindrical confining wall of chamber 4, driving of said reel 2 in a clockwise direction as viewed in Fig. 1 will effect through the tangential force applied by driving member 36 on the inner end of the coil of fish-wire, a bodily rotation of the coil and consequent paying out of the wire through passage 5 and flexible conduit 27. Then any resistance to the paying out of the fish-wire sets up a moment arm about pivot 38 whereby the free end of said driving member 36 will be caused to exert both tangential and radial outward force components on the inner end of the fish-wire, such forces serving to progressively expand the core of the coil for retaining the inner and successive convolutions in contact with one another and for continuously urging the outer convolution against the rollers 11. In this way there is always a solid coil of fish-wire in case 1 supported against buckling by the confining cylindrical wall of said case even though considerable resistance may be encountered to the paying out of the wire. As the wire is payed out the measuring device contained within housing 17 will indicate the length of wire so payed out whereupon the motor 39 may be de-energized when desired.

With the desired length of fish-wire thus payed out, a cable or conductor wire is attached to the outer end of the fish-wire which is preferably formed with an eye 46, as best shown in Fig. 1, and the support member 20 is suitably adjusted to move case 1 away from the conduit into which the cable or conductor wire is to be drawn.

As apparent, energization of said motor 39 to drive reel 2 in a counter-clockwise direction, as viewed in Fig. 1 will effect rewinding of the fish-wire onto said reel to thus draw the cable or conductor wire into the conduit. In rewinding, the driving member 36 moves into recess 35 in hub 29 and the fish-wire is wound around the hub, the first few revolutions of said reel being operative to reduce the inside diameter of the coil and accordingly reduce the outside diameter of the coil before effecting a drawing in of the fish-wire through the flexible conduit 27 and passage 5. Here again the maximum angle of bend of the fish-wire between passage 5 over guide rolls 13 and the free end of the driving member 36 when the latter is in recess 35 is within safe limits so as not to distort the fish-wire even though considerable tension may be applied thereto in drawing the cable or conductor wire.

From the foregoing it is clear that the present improvements provide a cable pulling apparatus of compact portable form and of simple foolproof construction enabling positive driving of the fish-wire into a conduit and drawing of the same from the conduit.

Other modes of applying the principle of the invention may be employed, change being made as regards the details described, provided the features stated in any of the following claims, or the equivalent of such, be employed.

I therefore particularly point out and distinctly claim as my invention:

1. In combination, a reel provided with a circumferentially extending recess, an arm in such recess having one end pivotally connected to said reel for swinging of said arm to a position with its other end disposed radially outward out of such recess, a spirally coiled fish-wire on said reel having its inner end connected to such other end of said arm, a case rotatably supporting said reel and provided with a cylindrical confining wall encircling said coil of wire and with a passage through which said wire is adapted to be payed out, said arm being of length between the pivoted end and the end connected to said wire greater than the minimum radial dimension between the pivot and the confining wall whereby rotation of said reel in a direction to pay out wire from the coil causes said arm to apply both radial outward and tangential force components on the inner end of the wire for progressively expanding the coil and continuously urging the outer convolution against such confining wall.

2. In combination, a reel provided with a circumferentially extending recess, an arm in such recess having one end pivotally connected to said reel for swinging of said arm to a position with its other end disposed radially outward out of such recess, a spirally coiled fish-wire on said reel having its inner end connected to such other end of said arm, a case rotatably supporting said reel and provided with a cylindrical confining wall encircling said coil of wire and with a passage through which said wire is adapted to be payed out, said arm being of length between the pivoted end and the end connected to said wire greater than the minimum radial dimension between the pivot and the confining wall whereby rotation of said reel in a direction to pay out wire from the coil causes said arm to apply both radial outward and tangential force components on the inner end of the wire for progressively expanding the coil and continuously urging the outer convolution against such confining wall, and a plurality of circularly arranged rollers along such confining wall engaged by the wire, said rollers being freely rotatable about axes parallel to the axis of said reel, said arm being adapted to swing to a position with such other end thereof radially outward of such confining wall and within such passage whereby to arrest further rotation of said reel in a direction to pay out wire.

3. In combination, a spirally coiled fish-wire, a case around said coil provided with a passage through which the wire may be payed out, a support on said case, and means mounting said support for adjustment on said case along a path generally parallel to the direction of movement of the wire when payed out from such passage, said support being disposed to abut one side of a conduit box upon drawing in of the fish wire into said case and to abut the opposite side of the conduit box upon paying out of the fish wire whereby to predeterminedly position said case in both instances.

4. In combination, a spirally coiled fish-wire, a case around said coil provided with a passage through which the wire may be payed out, a support on said case, and means mounting said support for adjustment on said case along a path generally parallel to the direction of movement of the wire when payed out from such passage, said support being provided with a hook thereon adapted to abut one side of a conduit box upon drawing of the fish wire into said case and to hook over the opposite side of the conduit box upon paying out of the fish wire whereby to predeterminedly position said case in both instances.

5. The combination with a spirally coiled fish-wire, of an outer member encircling such coil and provided with a passage through which the wire may be payed out, a revolvable reel on which such coil is wound, and a radially movable driving member on said reel connected to the inner end of such coil and operative to apply radial outward and tangential force components on the inner end of the coil, said driving member comprising an arm having one end connected to said reel for pivotal movement about an axis parallel to the axis of said reel and the other end connected to the inner end of the coil, said driving member being of length exceeding the distance from the pivotal axis thereof to said outer member and adapted to enter such passage to arrest rotation of said reel.

6. In combination, a reel with a spirally coiled fish-wire thereon, a case rotatably supporting said reel provided with a confining wall encircling the coil of wire and with a passage through which the wire may be payed out, said confining wall comprising a recess extending radially thereinto, and means responsive to rotation of said reel in a direction to pay out wire to continuously urge the outer convolution of the coil against such confining wall, said means comprising a radially movable member connected to said reel and to the inner end of the coil and movable radially into such recess upon payout of the wire through such passage whereby to arrest further rotation of said reel in a direction to pay out wire.

7. In combination, a reel with a spirally coiled fish-wire thereon, a case rotatably supporting said reel provided with a confining wall encircling the coil of wire and with a passage through which the wire may be payed out, said confining wall comprising a recess extending radially thereinto, and means responsive to rotation of said reel in a direction to pay out wire to continuously urge the outer convolution of the coil against such confining wall, said means comprising an arm having one end connected to said reel for pivotal movement about an axis parallel to the axis of said reel and the other end connected to the inner end of the coil, such other end of said arm being swingable radially into such recess upon paying out of the wire whereby to arrest rotation of the reel in a direction to pay out wire.

8. In combination, a reel with a spirally coiled fish-wire thereon, a case rotatably supporting said reel provided with a confining wall encircling the coil of wire and with a passage through which the wire may be payed out, and means responsive to rotation of said reel in a direction to pay out wire to continuously urge the outer convolution of the coil against such confining wall, said means comprising a radially movable member connected to said reel and to the inner end of the coil to transmit rotation of said reel to the coil of wire to thus pay out wire and to move radially to maintain each convolution of the coil against its surrounding convolution, said case and said member being formed with opposed radially overlapping portions operative upon predetermined radial movement of said member to abut each other and thereby arrest further rotation of said reel in said case in a direction to pay out wire.

WILLIAM E. RANEY.

REFERENCES CITED

The following references are of record in the file of this patent:

UNITED STATES PATENTS

| Number | Name | Date |
|---|---|---|
| 644,884 | Wrigley | Mar. 6, 1900 |
| 1,087,067 | King | Feb. 10, 1914 |
| 1,107,250 | Bigham | Aug. 18, 1914 |
| 1,194,979 | Etheridge | Aug. 15, 1916 |
| 1,761,592 | Seidel | June 3, 1930 |
| 1,815,433 | Dunagan | July 21, 1931 |
| 1,865,113 | Kiesel | June 28, 1932 |
| 1,956,806 | Mitzen | May 1, 1934 |
| 2,089,031 | MacDonald | Aug. 3, 1937 |